(12) United States Patent
Bregman et al.

(10) Patent No.: US 11,989,539 B2
(45) Date of Patent: May 21, 2024

(54) CONTINUOUS INTEGRATION AND DEPLOYMENT SYSTEM TIME-BASED MANAGEMENT

(71) Applicant: RED HAT, INC., Raleigh, NC (US)

(72) Inventors: Arie Bregman, Gan Yavne (IL); Avraham Avi Talmor, Rishon Leziyon (IL)

(73) Assignee: Red Hat, Inc., Raleigh, NC (US)

( * ) Notice: Subject to any disclaimer, the term of this patent is extended or adjusted under 35 U.S.C. 154(b) by 42 days.

(21) Appl. No.: 17/845,585

(22) Filed: Jun. 21, 2022

(65) Prior Publication Data

US 2023/0409305 A1    Dec. 21, 2023

(51) Int. Cl.
*G06F 8/60* (2018.01)
*G06F 8/30* (2018.01)

(52) U.S. Cl.
CPC ............... *G06F 8/60* (2013.01); *G06F 8/311* (2013.01)

(58) Field of Classification Search
CPC ........................................................ G06F 8/60
See application file for complete search history.

(56) References Cited

U.S. PATENT DOCUMENTS

| | | | |
|---|---|---|---|
| 6,681,331 B1* | 1/2004 | Munson | G06F 21/55 |
| | | | 714/E11.209 |
| 8,719,809 B2* | 5/2014 | Gokhale | G06F 8/62 |
| | | | 717/169 |
| 10,437,585 B2 | 10/2019 | Mills | |
| 10,452,435 B2 | 10/2019 | Novak et al. | |
| 10,728,364 B1 | 7/2020 | Licata | |
| 11,343,142 B1* | 5/2022 | Wang | G06N 7/01 |
| 2016/0011901 A1* | 1/2016 | Hurwitz | G06F 9/46 |
| | | | 718/101 |
| 2017/0228312 A1 | 8/2017 | Shani et al. | |
| 2019/0235847 A1 | 8/2019 | Nguyen et al. | |
| 2019/0235988 A1 | 8/2019 | Janjua et al. | |
| 2020/0135264 A1* | 4/2020 | Brady | G11C 11/406 |
| 2022/0164452 A1* | 5/2022 | Landman | H04L 9/0618 |
| 2023/0033084 A1* | 2/2023 | A | G06F 11/366 |
| 2023/0041213 A1* | 2/2023 | Jones | G06F 30/12 |

* cited by examiner

*Primary Examiner* — Jae U Jeon
(74) *Attorney, Agent, or Firm* — Dority & Manning, P.A.

(57) ABSTRACT

Systems and methods for managing components of the CI/CD system in view of time-based records associated with the components. An example method comprises retrieving a plurality of records generated by a plurality of components of a continuous integration and continuous delivery/deployment (CI/CD) system; receiving a time value; identifying, in view of the plurality of records, at least one component of the plurality of components that has been executed at the time value; and performing an action on the at least one component.

17 Claims, 5 Drawing Sheets

```
                                                                    ┌─ 200
                                                                    ▼

┌─────────────────────────────────────────────────────────────────────────────┐
│ Retrieve a plurality of records generated by a plurality of components of a │
│ continuous integration and continuous delivery/deployment (CI/CD) system,   │
│ wherein each record of the plurality of records is associated with a        │
│ respective timestamp                                                         │
│                                   210                                        │
└─────────────────────────────────────────────────────────────────────────────┘
                                     │
                                     ▼
┌─────────────────────────────────────────────────────────────────────────────┐
│                              Receive a time value                            │
│                                                                              │
│                                   220                                        │
└─────────────────────────────────────────────────────────────────────────────┘
                                     │
                                     ▼
┌─────────────────────────────────────────────────────────────────────────────┐
│ Identify, in view of the plurality of records, at least one component of    │
│ the plurality of components that has been executed at the time value        │
│                                                                              │
│                                   230                                        │
└─────────────────────────────────────────────────────────────────────────────┘
                                     │
                                     ▼
┌─────────────────────────────────────────────────────────────────────────────┐
│                  Perform an action on the at least one component.            │
│                                                                              │
│                                   240                                        │
└─────────────────────────────────────────────────────────────────────────────┘
```

FIG. 2

CONTINUOUS INTEGRATION AND DEPLOYMENT SYSTEM TIME-BASED MANAGEMENT

TECHNICAL FIELD

The present disclosure is generally related to continuous integration and deployment (CI/CD) system management, and more particularly, to managing components of the CI/CD system in view of time-based records associated with the components.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed periodically, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 depicts an exemplary user interface for managing components of the CI/CD system based on time-based records associated with the components, in accordance with one or more aspects of the present disclosure;

Figure 1:
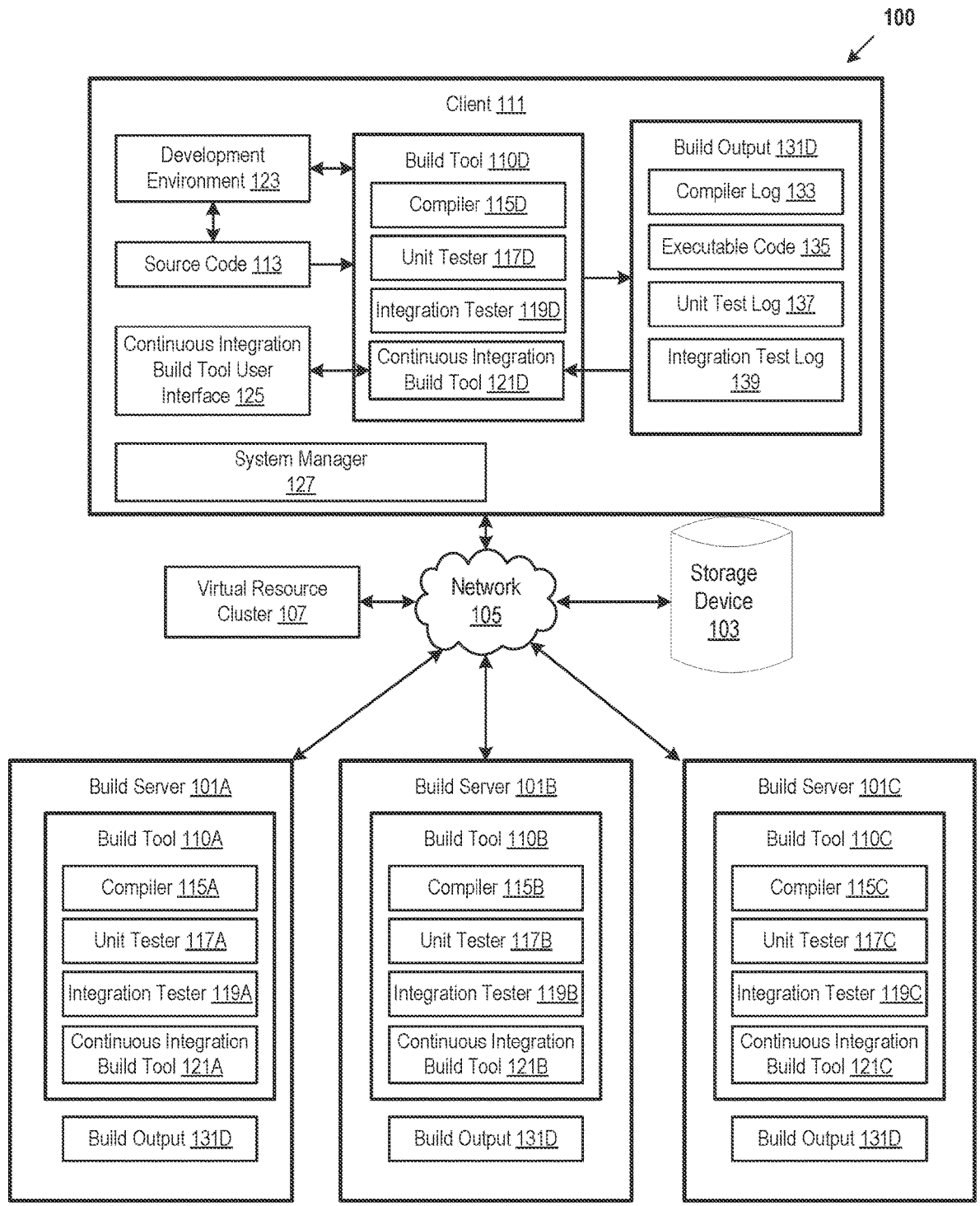
FIG. 1 depicts a high-level block diagram of an example computing environment that includes a CI/CD system manager that performs action commands on components that generated corresponding records within a period of time, in accordance with one or more aspects of the present disclosure.

Described herein are systems and methods for managing components of a continuous integration and continuous deployment (CI/CD) system based on time-based records associated with the components. CI/CD is a method to deliver applications to customers by introducing automation into the stages of software (e.g., application) development. CI/CD is a solution to the problems integrating new code can cause for development and operations teams. CI/CD introduces ongoing automation and continuous monitoring throughout the software lifecycle, from integration and testing phases to delivery and deployment phases. Taken together, this sequence of operations is often referred to as a "CI/CD pipeline" and is supported by development and operations ("DevOps") teams working together in an agile way with either a DevOps or Site Reliability Engineering (SRE) approach.

Continuous integration (CI) generally refers to an automation process for user groups (e.g., developers). Successful CI means new code changes can be regularly built, tested, and merged to a shared repository. CI provides a solution to the problem of having too many potentially conflicting branches of an application in development. The "CD" in CI/CD stands for continuous delivery and/or continuous deployment, which are related concepts that sometimes get used interchangeably. Both continuous delivery and continuous deployment generally refer to automating further stages of the CI/CD pipeline.

In some instances, the CI/CD may also be referred to as "build process," which may generate software images from source code and other data. Software images may be, for example, executable code of software application programs. Source code may include instructions in a programming language that may be translated to executable code. The translation from source code to executable code may be performed by compiler programs. Other data may also be processed, e.g., transformed to suitable formats, and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built. A particular set of instructions specifying how to perform a particular build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which may be executed sequentially in an active build. A job may thus be referred to as a "pipeline" of one or more stages. The stages may include, for example, compile, test, and deploy stages. The compile stage may translate source code to executable code, the test stage may perform tests to verify that the executable code operates correctly, and the deploy stage may install the executable code on host machines, for example. A build may execute for a substantial period of time (e.g., several minutes to several hours or days).

Based on the automated nature of CI/CD systems (e.g., by employing various build tools for implementing build processes), the pipelines of the CI/CD systems are designed to be scheduled and/or executed in response to a trigger event. Typically, each pipeline may have one or more external dependencies, systems, and/or services (e.g., plugins, file servers, application programming interfaces, permission, configuration files, etc.) that are necessary to successfully execute the respective pipeline. These external dependencies, systems, and/or services (collectively referred to as "external components") may experience various adverse conditions that may result in the external components being unavailable to one or more dependent pipelines (e.g., pipelines that require the external components to successful be executed). Depending on the duration of time the external components is unavailable, the one or more dependent pipelines may fail or may not be properly executed. Accordingly, the one or more dependent pipelines may need to be re-executed.

Current systems fail to provide features for identifying the one or more dependent pipelines that may have failed during a period of time the external components were unavailable. In particular, current systems fail to associate respective time values to actions of components of the CI/CD system, for example, execution of a pipeline. The lack of time values associated with actions of components of the CI/CD system can lead to an inability to identify components that were executed at a specific time or within a range of time in which the external components were unavailable. Thus, such a system would be unable to re-execute specific components that were affected by the unavailability of the external components, or perform any other corrective actions. Accordingly, it is desirable to provide the ability to manage various components of the CI/CD system in view of time-based records generated by the various components of the CI/CD system.

Aspects of the present disclosure address the above-noted and other deficiencies by enhancing CI/CD systems with the ability to manage various components of the CI/CD system in view of time-based records generated by the various components of the CI/CD system. In an illustrative example, a system manager may generate, in response to each operation and/or execution of a component of the CI/CD system, a record with a corresponding time-stamp associated with the operation and/or execution of the component. The components may include a pipeline, a plugin, a test, a release, a user group, etc.

In some embodiments, the system manager may store each record generated by a component of the CI/CD system. The system manager may receive a time value as an input. The time value may be a specific time (e.g., Apr. 1, 2022, 10:00 AM) or a range of time (e.g., Apr. 20, 2022, 2:00 AM-Apr. 20, 2022, 10:00 AM). The input may be from a user via a graphical user interface (GUI), or from an external component indicating a time period in which the external component experience a specific event. Accordingly, the system manager may traverse the stored records to identify a subset of records with a corresponding time-stamp within the time range. In some embodiments, the system manager may distinguish between records associated with components that were not completely executed within the time range and those executed and completed within the time range. In some embodiments, the system manager may distinguish between records associated with components that were initiated before the start time of the time range but completed within the time range and those executed and completed within the time range.

For each identified record, the system manager may display, via the GUI, each component associated with a respective identified record. The system manager may receive an action command as an input (e.g., from a user via the GUI) indicating an action to perform on each component (e.g., a pipeline, configuration files, plugins, etc.) associated with the identified records within the time range. Action commands may include a re-execute command to be performed on a component (e.g., a pipeline) (e.g., to re-execute pipelines of the CI/CD systems), a revert command to be performed on a component (e.g., a configuration file or plugin) (e.g., to revert updates to configuration files, plugins, or other updatable components of the CI/CD systems), a remove command to be performed on a component (e.g., to remove components of the CI/CD systems), and an update command to be performed on a component (e.g., configuration file or plugin) (e.g., to update configuration files, plugin, or other updatable components of the CI/CD systems). Accordingly, aspects of the present disclosure provide a user the ability to manage components of the CI/CD system more efficiently by performing action commands on a subset of the components affected within a specific time period rather than all components scheduled within the specific time period.

Various aspects of the above referenced methods and systems are described in details herein below by way of examples, rather than by way of limitation.

FIG. 1 depicts a high-level block diagram of an example computing environment 100 that includes a system manager 127, in accordance with one or more aspects of the present disclosure. The computing environment 100 may provide build management services that include executing build operations to perform builds of source code 113 to produce build output 131A-D. The builds may be performed in accordance with instructions provided by the continuous integration build tool user interface 125. The computing environment 100 may include build servers 101A-C for running the sets of operations for providing builds in a continuous integration environment. The builds may be for source code 113, e.g., of an application being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build periodically or in response to user requests, and presenting information about the status of executing builds and the results of completed builds. A software build job (e.g., a pipeline of one or more stages) can be executed by build tool 110A-D.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base stored and maintained by build server 101A-C. Users may submit source code 113 to any of the build tools 110A-D daily (or more frequently) and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. Network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110A-D may include a compiler 115A-D to compile computer source code 113 into executable code 135 and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing the progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests) and presenting information about the status of executing builds and the results of completed builds. Continuous integration build tool 121A-D may start a build, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example. Continuous integration build tool 121A-D may generate an integration test log 139 containing information describing the progress of the operations performed by the continuous integration build tool 121A-D.

Integration tester 119A-D may create virtual resource cluster 107 for the integration testing of the artifacts. The virtual resources in cluster 107 may be containers, virtual machines, container(s) within a virtual machine, and/or virtual machine(s) running within a container. A container may refer to an isolated set of resources allocated to executing an application and/or process independent from other applications and/or processes. A virtual machine may be an emulated computer system created using software, which includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101A-C and/or client 111. In another example, virtual resource cluster 107 may include one or more other computing machines not shown by FIG. 1. The computing machines may be server computer systems, desktop computers or any other computing devices.

A host machine may allocate a certain amount of its computing resources (e.g., processor resources (CPU resources), physical or virtual memory, input/output (I/O) resources, network resources, etc.) to individual virtual resources (e.g., a virtual machine, container), and may multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor may emulate the underlying hardware (e.g., infrastructure) of the host machine, making use of the virtual machine. Accordingly, each build tool 110A-D (or build server 101A-C and/or client 111) may be allotted a different set of computing resources. By way of illustrative example only, build tool 110A may be allotted two 2.4 megahertz (MHz) processors, and 2 gigabytes (GB) of RAM memory, build tool 110B may be allotted four 3.2 MHz processors and 16 GB of RAM memory, etc.

An application being deployed in the container may run under the host operating system. The host machine for the container may include a container engine to create and manage the containers. In one implementation, a container may run on a virtual machine to provide an extra layer of separation between applications running on a guest operating system of the virtual machine. In one implementation, a virtual machine may run on a container to maintain isolation and security properties of virtual machines while being able to package and distribute computer programs as a container.

Integration tester 119A-D may run the executable code 135 in virtual resource cluster 107 and run integration tests against the distributed system provided by virtual resource cluster 107. After build tool 110A-D compiles the source code 113 and runs unit tests and integration tests, build tool 110A-D may report whether the attempt to provide the build was a success or includes a failure. A failure may be caused by the compiling of the source code failing, unit testing failing, and/or integration testing failing.

Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110A-D can execute to perform builds. Instructions can be provided to build tools 110A-D in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Client 111 may further include system manager 127 to manage various components of the CI/CD system in view of time-based records generated by the various components of the CI/CD system. System manager 127 identifies a plurality of components of the computing environment 100, in particular, components associated with performing builds of source code 113. The components may include a pipeline, a plugin, a test, a release, a user group, or etc. For each component of the computing environment 100, in response to each event of a respective component of the computing environment 100, the system manager 127 generates a record and a corresponding time-stamp of the event. In some embodiments, each record from the plurality of records may be time-stamped based on the completion of a corresponding event. In some embodiments, each record from the plurality of records may be time-stamped based on the initiation of a corresponding event. The system manager 127 may store the plurality of records in storage device 103. A user interface (e.g., continuous integration build tool user interface 125) may receive a time value input. The time value input may be a time period in which an external component experienced downtime or any event that may affect the components of the computing environment 100. The time value may be a specific time (e.g., Apr. 1, 2022, 10:00 AM) or a range of time (e.g., Apr. 20, 2022, 2:00 AM-Apr. 20, 2022, 10:00 AM).

In some embodiments, the system manager 127 may be automatically notified if one or more components of the computing environment 100 has experienced downtime or any event affecting the components of the computing environment 100. Accordingly, the system manager 127 may receive a time period associated with the one or more components that experienced downtime and automatically set the time period as the time value input without any input via the user interface.

Once the time value input is received, the system manager 127 may retrieve the plurality of records from storage device 103 and traverse each record of the plurality of records to identify records that fall within the time range specified by the input. For example, the time value input may be a range of time from Apr. 20, 2022, 2:00 AM to Apr. 20, 2022, 10:00 AM based on an external component (e.g., an API or server) being unavailable. The system manager 127 may traverse the plurality of records may and determine that a record from the plurality of records has a time-stamp of Apr. 20, 2022, 2:03 AM, which is after Apr. 20, 2022, 2:00 AM. The system manager 127 may identify the component that generated the record (e.g., via a unique identifier associated with the component that is stored with the record) and display to the user a visual representation of the component (e.g., an identifier, symbolic name or icon, or other parameters indicative of the component). In some embodiments, each component identified is stored in a list of identified components and then display (e.g., the visual representative of the component) and/or provided to the user at once. The system manager 127 continues to traverse each record, identify, and store a corresponding component until the system manager 127 identifies a record from the plurality of records that has a time-stamp after Apr. 20, 2022, 10:00 AM, for example, a record that has a time-stamp of Apr. 20, 2022, 11:27 AM. Depending on when the record was time-stamped, the system manager 127 may distinguish between records associated with components that were not completely executed within the time range input and those executed and completed within the time range input. In some embodiments, the system manager may distinguish between records associated with components executed prior to the time value but completed within the time range input and those executed and completed within the time range input.

The system manager 127 may display via the continuous integration build tool user interface 125 a visual representation of each component in the list of identified components to the user. The system manager 127 may receive, via the continuous integration build tool user interface 125, an action command as an input indicating an action to perform on all the components of the list of identified components. Action commands may include a re-execute command (e.g., to re-execute components identified as pipelines), a revert command (e.g., to revert updates to components identified as configuration files, plugin, or other updatable components), a remove command (e.g., to remove components), and an update command (e.g., to update components identified as configuration files, plugin, or other updatable components). Responsive to receiving the action command, the system manager 127 may perform and/or cause other elements of the computing environment 100 to perform the action on all the components of the list of identified components.

In some embodiments, the system manager 127, rather than receiving an action command as input from the user interface, may automatically perform a default action command associated with the identified components. Each component (or build job) of the computing environment 100 may include one or more corresponding action commands configured in advance. For example, if a component of the identified components is a configuration file, system manager 127 may identify whether the component has been recently updated or is out of date based on parameters of the component or the record generated by the component during the time value input. Thus, system manager 127 may indicate that the component is set to a revert command (e.g., if the parameter or record indicates that the component was recently updated) or set to an update command (e.g., if the parameter or record indicates that the component was out of date). In another example, if the component of the identified components is a pipeline, system manager 127 may identify that the pipeline is set to a re-execute command or that the pipeline is associated to a build job which is set to a re-execute command.

In some embodiments, the system manager 127 may receive, via the continuous integration build tool user interface 125, a filtering criteria to further reduce the list of identified components. The filtering criteria may be a type of component, information associated with the components, elements of the computing environment 100, or any other information suitable for reducing the number of elements in the list of identified components. Thus, the system manager 127 may display via the continuous integration build tool user interface 125 a visual representation of each component in the reduced list of identified components to the user. Accordingly, responsive to receiving the action command, the system manager 127 may perform and/or cause other elements of the computing environment 100 to perform the action on all the components of the reduced list of identified components rather than the original list of identified components.

FIG. 2 depicts a flow diagram of an example method 200 for managing components of the CI/CD system in view of time-based records associated with the components, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 200 may be performed by an execution management component, such as the system manager 127 in FIG. 1. Alternatively, some or all of method 200 might be performed by another module or machine. It should be noted that blocks depicted in FIG. 2 could be performed simultaneously or in a different order than that depicted.

At block 210, the processing logic retrieves a plurality of records generated by a plurality of components of a continuous integration and continuous delivery/deployment (CI/CD) system. Each record of the plurality of records is associated with a respective time-stamp. As previously described, each record is generated in response to an event associated with a respective component either being initiation or completed.

At block 220, the processing logic receives a time value. The time value may be a specific time (e.g., Apr. 1, 2022, 10:00 AM) or a range of time (e.g., Apr. 20, 2022, 2:00 AM-Apr. 20, 2022, 10:00 AM).

At block 230, the processing logic identifies, in view of the plurality of records, at least one component of the plurality of components that has been executed at the time value. The processing logic, to identify the at least one component that has been executed at the time value, traverse each record of the plurality of records between a start time of the time value and an end time of the time value to identify each component that produced a respective record. The processing logic generates a list of identified components associated with each identified component.

Depending on the embodiment, the processing logic receives at least one filtering criteria to filter the list of components. The filtering criteria may be a type of component, such as, a pipeline, a plugin, a test, a release, a user group or etc.

At block 240, the processing logic performs an action on the at least one component. Performing the action on the identified at least one component is responsive to receiving an action command. The action commands may be a re-execute command, a revert command, a remove command, an update command, etc.

Figure 3:
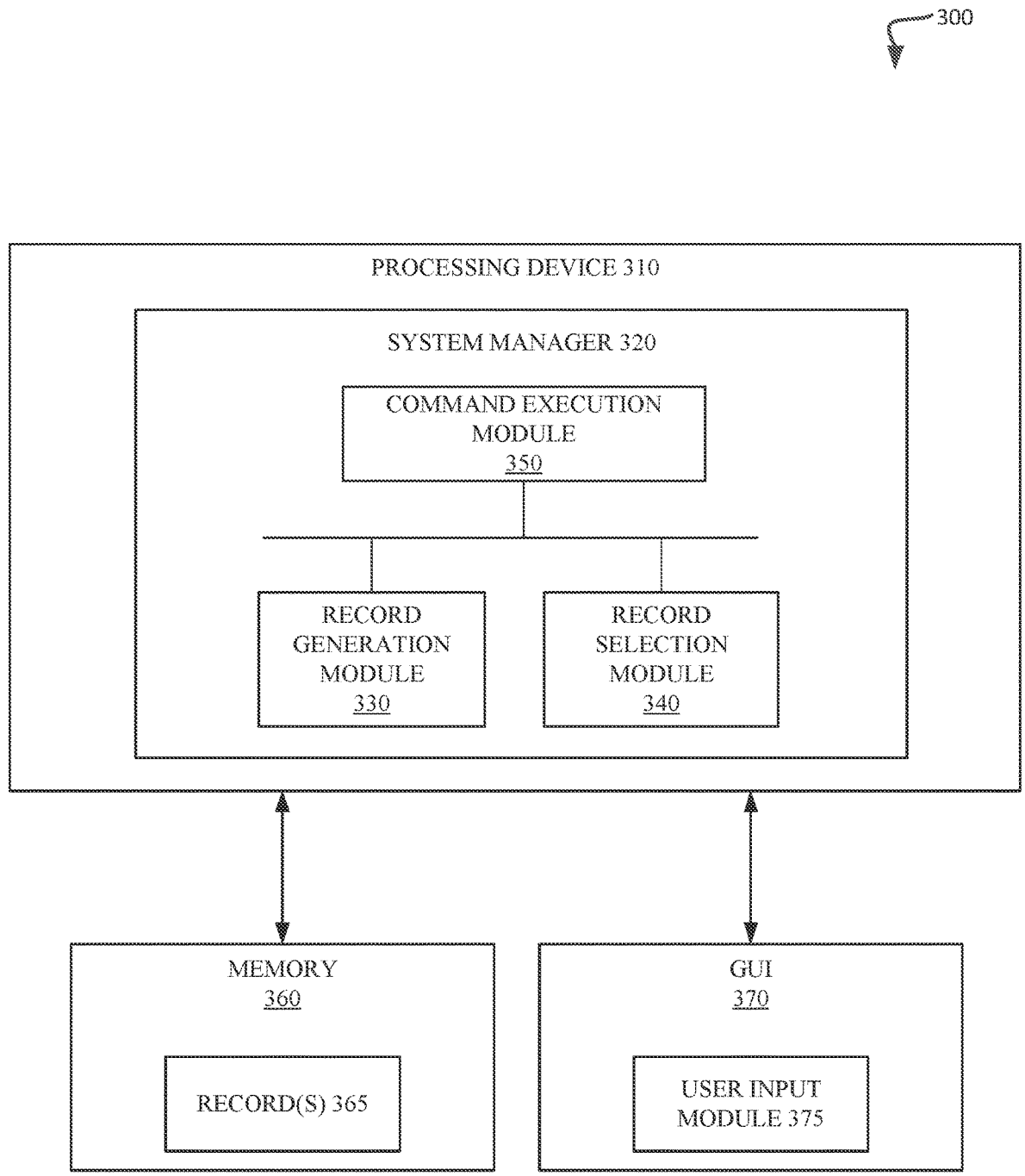
FIG. 3 depicts a flow diagram of an example method for managing components of the CI/CD system based on time-based records associated with the components, in accordance with one or more aspects of the present disclosure.

FIG. 3 depicts a block diagram illustrating an example of a system manager 320 for managing components of the CI/CD system in view of time-based records associated with the components. In some implementations, system manager 320 may correspond to system manager 127 of FIG. 1. As shown in FIG. 3, system manager 320 may be a component of a computing environment 300 that includes a processing device 310, operatively coupled to a memory 360, to store a plurality of records associated with a plurality of components of a CI/CD system and operatively coupled to a graphical user interface (GUI) 370, to receive user input via a user input module 375 to identify and display a visual representation of specific components of the CI/CD system based on the plurality of records. The system manager 310 may include a record generation module 330, a record selection module 340, and a command execution module 350. The memory 360 includes a plurality of records 365. The GUI 370 includes a user input module 375.

Record generation module 330 is responsible for generating a record 365 with a time-stamp in response to each event of a component. In some embodiments, the time-stamp is based on the completion of the event of the component. In some embodiments, the time-stamp is based on the initiation of the event of the component. Record generation module 330 may further store each record 365 in memory 360.

Record selection module 340 is responsible for retrieving a subset of records from records 365 stored in memory 360. In particular, GUI 370 receives a time value from the user input module 375. The time value may be a specific time (e.g., Apr. 1, 2022, 10:00 AM) or a range of time (e.g., Apr. 20, 2022, 2:00 AM-Apr. 20, 2022, 10:00 AM). Record selection module 340 may traverse each record of the records 365 to identify records that fall within the time range. For example, one or more records of records 365 that have a time-stamp that falls between a range of time Apr. 20, 2022, 2:00 AM-Apr. 20, 2022, 10:00 AM or one or more records of records 365 that have a time-stamp that has a specific time Apr. 1, 2022, 10:00 AM. Record selection module 340 may obtain each component associated with each of the one or more records and generate a list of components. The list of components may be stored in memory 360. Record selection module 340 may display a visual representation of the list of components to the user via GUI 370. Additionally, and/or alternatively, the GUI 370 may receive a filter criteria from the user input module 375 to reduce the list of components. The filter criteria may be may be a type of component, information associated with the components, elements of the computing environment, or any other information suitable for reducing the number of components in the list of components.

Command execution module 350 is responsible for executing an action on the list of components. In particular, GUI 370 receives an action command from the user input module 375. The action command is a command indicating an action to perform on the list of components. Examples of action commands may include a re-execute command (e.g., to re-execute components identified as pipelines), a revert command (e.g., to revert updates to components identified as configuration files, plugins, or other updatable components), a remove command (e.g., to remove components), and an update command (e.g., to update components identified as configuration files, plugin, or other updatable components). Accordingly, in response to receiving the action command, command execution module 350 may perform and/or cause other elements of the computing environment to perform the action on all the components of the list of components.

Figure 4:
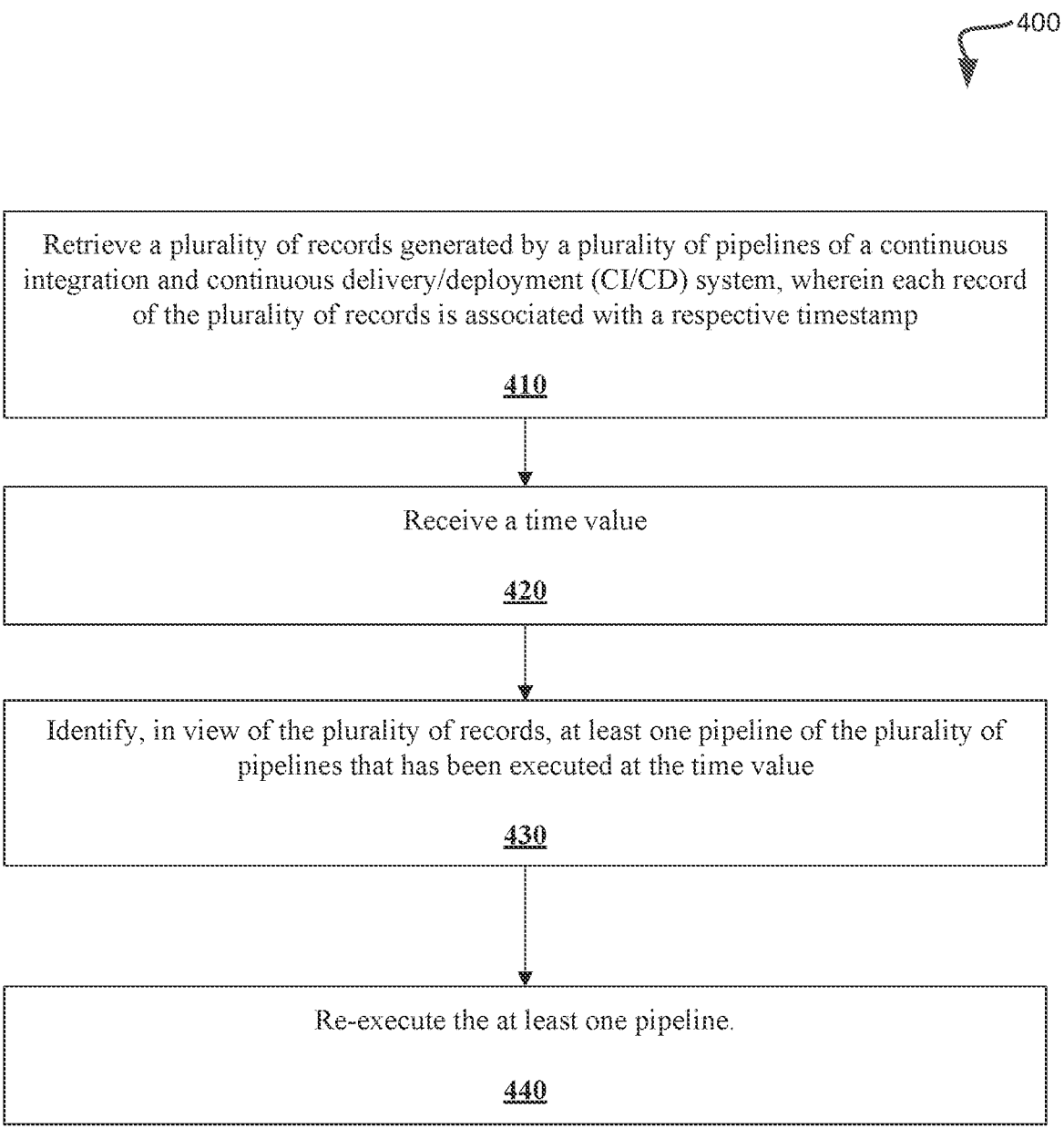
FIG. 4 depicts a block diagram of a computer system operating in accordance with one or more aspects of the present disclosure.

FIG. 4 depicts a flow diagram of an example method 400 for managing components of the CI/CD system in view of time-based records associated with the components, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 400 may be performed by an execution management component, such as the system manager 127 in FIG. 1. Alternatively, some or all of method 400 might be performed by another module or machine. It should be noted that blocks depicted in FIG. 4 could be performed simultaneously or in a different order than that depicted.

At block 410, the processing logic retrieves a plurality of records generated by a plurality of pipelines of a continuous integration and continuous delivery/deployment (CI/CD) system. Each record of the plurality of records is associated with a respective time-stamp. At block 420, the processing logic receives a time value.

At block 430, the processing logic identifies, in view of the plurality of records, at least one pipeline of the plurality of pipelines that has been executed at the time value. The processing logic, to identify the pipeline of the plurality of pipelines that has been executed at the time value, traverses each record of the plurality of records between a start time of the time value and an end time of the time value to identify each pipeline of the plurality of pipelines that produced a respective record. The processing logic generates a list of identified pipelines associated with each identified pipeline of the plurality of pipelines. In some embodiments, the processing logic receives at least one filtering criteria and filters the list of identified pipelines based on the at least one filtering criteria.

At block 440, the processing logic re-executes at least one pipeline. Re-executing the at least one pipeline is performed responsive to receiving a re-execute command.

Figure 5:
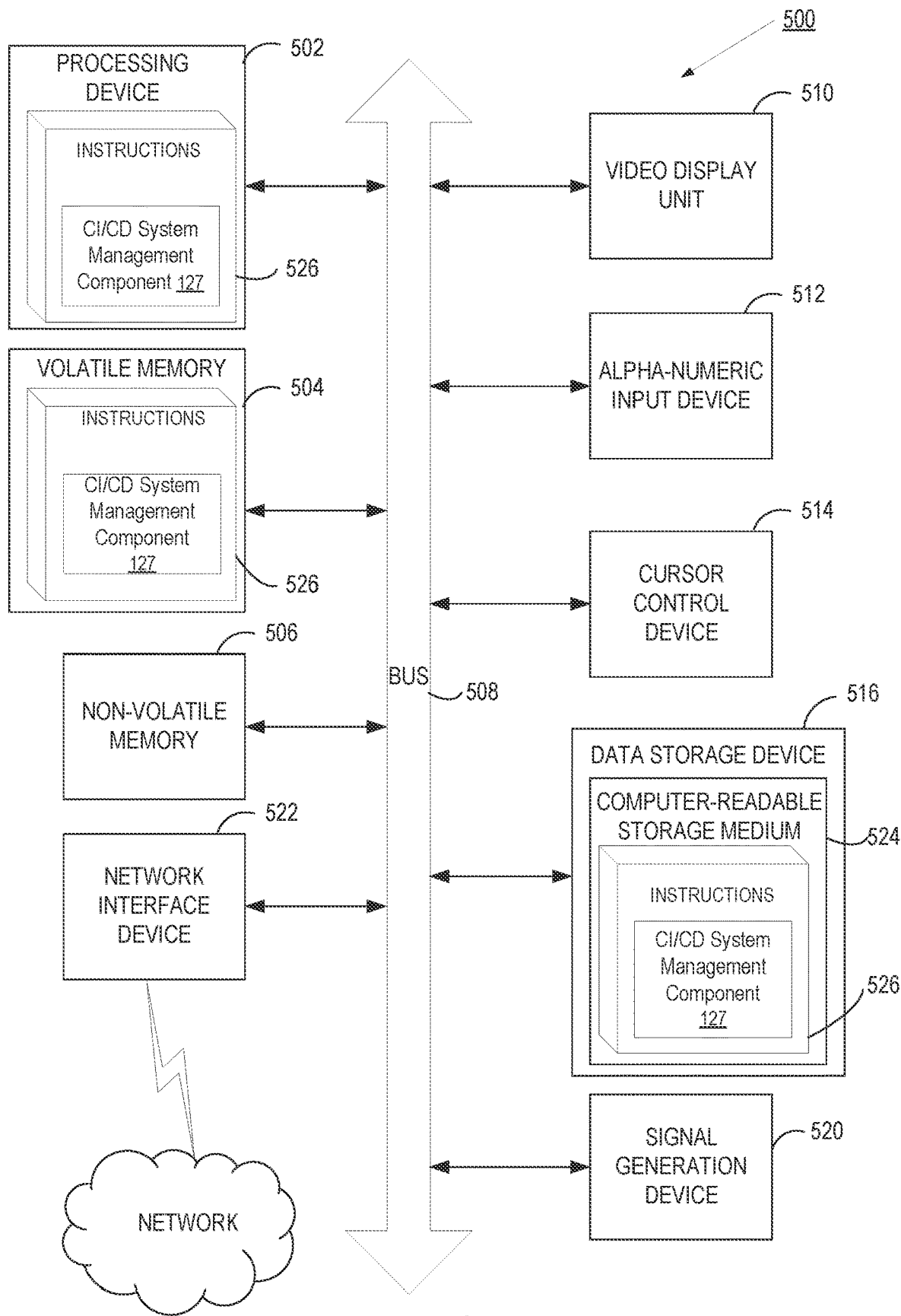
FIG. 5 depicts a flow diagram of another example method for managing components of the CI/CD system based on time-based records associated with the components, in accordance with one or more aspects of the present disclosure.

FIG. 5 depicts a block diagram of a computer system operating in accordance with one or more aspects of the present disclosure. In various illustrative examples, computer system 500 may correspond to computing environment 100 of FIG. 1. Computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 and 500.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
generating, for each execution of a component of a plurality of components of a continuous integration and continuous delivery/deployment (CI/CD) system, a record with a corresponding time-stamp associated with the execution of the component;
storing, in a storage device, the record, wherein the storage device stores a plurality of records;
receiving, in response to an external component experiencing a downtime, a time value associated with a period of time in which the external component experienced downtime, wherein the external component is one of: a plugin, a file server, or an application programming interface;
in response to receiving an action command causing an action associated with the action command to be performed on, in view of the plurality of records, at least one component of the plurality of components executed at the time value.

2. The method of claim 1, wherein the action command is one of: a re-execute command, revert command, remove command, or update command.

3. The method of claim 1, wherein the time value is one of: a specific time or a range of time.

4. The method of claim 1, wherein identifying, in view of the plurality of records, the at least one component that has been executed at the time value comprises:
traversing each record of the plurality of records between a start time of the time value and an end time of the time value to identify each component that produced a respective record; and
generating a list of identified components associated with each identified component.

5. The method of claim 4, further comprising:
receiving at least one filtering criteria; and
filtering, based on the at least one filtering criteria, the list of components.

6. The method of claim 5, wherein the filtering criteria is a type of component.

7. The method of claim 6, wherein the type of components is at least one of: a pipeline, a plugin, a test, a release, and a user group.

8. A system comprising:
a memory; and
a processing device, operatively coupled to the memory, to perform operations comprising:
generating, for each execution of a component of a plurality of components of a continuous integration and continuous delivery/deployment (CI/CD) system, a record with a corresponding time-stamp associated with the execution of the component;
storing, in a storage device, the record, wherein the storage device stores a plurality of records;
receiving, in response to an external component experiencing a downtime, a time value associated with a period of time in which the external component experienced downtime, wherein the external component is one of: a plugin, a file server, or an application programming interface;
in response to receiving an action command causing an action associated with the action command to be performed on, in view of the plurality of records, at least one component of the plurality of components executed at the time value.

9. The system of claim 8, wherein the action command is one of: a re-execute, revert, remove, update.

10. The system of claim 8, wherein the time value is one of: a specific time or a range of time.

11. The system of claim 8, wherein identifying, in view of the plurality of records, the at least one component that has been executed at the time value comprises:
traversing each record of the plurality of records between a start time of the time value and an end time of the time value to identify each component that produced a respective record; and
generating a list of identified components associated with each identified component.

12. The system of claim 11, further comprising:
receiving at least one filtering criteria; and
filtering, based on the at least one filtering criteria, the list of components.

13. The system of claim 12, wherein the filtering criteria is a type of component.

14. The system of claim 13, wherein the type of components is at least one of: a pipeline, a plugin, a test, a release, and a user group.

15. A non-transitory computer-readable storage medium comprising instructions that, when executed by a processing device, cause the processing device to perform operations comprising:
generating, for each execution of a pipeline of a plurality of pipelines of a continuous integration and continuous delivery/deployment (CI/CD) system, a record with a corresponding time-stamp associated with the execution of the pipeline;
storing, in a storage device, the record, wherein the storage device stores a plurality of records;
receiving, in response to an external component experiencing a downtime, a time value associated with a period of time in which the external component experienced downtime, wherein the external component is one of: a plugin, a file server, or an application programming interface;

in response to receiving a re-execute command re-executing, in view of the plurality of records, at least one pipeline of the plurality of pipelines executed at the time value.

16. The non-transitory computer-readable storage medium of claim 15, wherein identifying, in view of the plurality of records, the pipeline of the plurality of pipelines that has been executed at the time value comprises:
   traversing each record of the plurality of records between a start time of the time value and an end time of the time value to identify each pipeline of the plurality of pipelines that produced a respective record; and
   generating a list of identified pipelines associated with each identified pipeline of the plurality of pipelines.

17. The non-transitory computer-readable storage medium of claim 16, causing the processing device to perform operations further comprising:
   receiving at least one filtering criteria; and
   filtering, based on the at least one filtering criteria, the list of identified pipelines.

* * * * *